(12) United States Patent
Iwahashi

(10) Patent No.: US 9,000,758 B2
(45) Date of Patent: Apr. 7, 2015

(54) ROTATION ANGLE DETECTING DEVICE

(75) Inventor: Masaru Iwahashi, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 358 days.

(21) Appl. No.: 13/394,718

(22) PCT Filed: Sep. 16, 2010

(86) PCT No.: PCT/JP2010/066028
§ 371 (c)(1),
(2), (4) Date: Mar. 7, 2012

(87) PCT Pub. No.: WO2011/040249
PCT Pub. Date: Apr. 7, 2011

(65) Prior Publication Data
US 2012/0169325 A1 Jul. 5, 2012

(30) Foreign Application Priority Data

Sep. 30, 2009 (JP) ................................. 2009-227390

(51) Int. Cl.
*G01B 7/30* (2006.01)
*G01D 5/14* (2006.01)
*G01D 11/24* (2006.01)

(52) U.S. Cl.
CPC .............. *G01D 5/145* (2013.01); *G01D 11/245* (2013.01)

(58) Field of Classification Search
CPC .............................. G01D 5/145; G01D 11/245
See application file for complete search history.

(56) References Cited

U.S. PATENT DOCUMENTS

| 5,880,585 | A | 3/1999 | Oguro |
| 7,078,893 | B2 * | 7/2006 | Nakano et al. ........... 324/207.25 |

(Continued)

FOREIGN PATENT DOCUMENTS

| CN | 101122472 A | 2/2008 |
| JP | 11-153404 A | 6/1999 |

(Continued)

OTHER PUBLICATIONS

English translation of JP2007-327860 patent on Dec. 20, 2007.*

(Continued)

*Primary Examiner* — Jermele M Hollington
(74) *Attorney, Agent, or Firm* — McDermott Will & Emery LLP

(57) ABSTRACT

Disclosed is a rotation angle detecting device wherein a filling member applied in a second housing section which houses an electromagnetic conversion element is prevented from entering a first housing section which houses a magnet. The rotation angle detecting device (1) is provided with: a rotating member (2); the magnet (3), which is fixed to the rotating member (2) and rotates with the rotation of the rotating member (2); a magnetism detecting package (4) that houses an electromagnetic conversion element (4a), which is disposed to face the magnet (3), and detects the intensity of the magnetic field of the magnet (3) by means of rotation of the magnet (3); a housing (5) having a first housing section (5b) that rotatably houses the rotating member (2), and a second housing section (5d) that houses the magnetism detecting package (4), with a partition (5f) as a reference; a filling member (10), with which the second housing section (5d) is filled such that the magnetism detection package (4) is hermetically housed and held; and a cylindrical metal member (11), which is provided in the first housing section (5b) such that the rotating member (2) is rotatably supported and a part (11a) of the metal member is exposed to the second housing section (5d).

5 Claims, 1 Drawing Sheet

(56) References Cited

U.S. PATENT DOCUMENTS

| | | | | |
|---|---|---|---|---|
| 8,200,113 | B2* | 6/2012 | Takami | 399/69 |
| 2002/0130656 | A1* | 9/2002 | Hagio et al. | 324/207.2 |
| 2004/0135574 | A1* | 7/2004 | Hagio et al. | 324/207.25 |
| 2006/0119353 | A1* | 6/2006 | Nakano et al. | 324/207.25 |
| 2011/0114061 | A1* | 5/2011 | Mase | 324/207.25 |
| 2011/0137609 | A1* | 6/2011 | Itomi | 324/207.25 |
| 2013/0314079 | A1* | 11/2013 | Suzuki et al. | 324/207.25 |
| 2014/0111193 | A1* | 4/2014 | Mizunuma et al. | 324/207.25 |

FOREIGN PATENT DOCUMENTS

| | | | |
|---|---|---|---|
| JP | 2007-327860 A | 12/2007 | |
| JP | 2007327860 A * | 12/2007 | G01D 5/18 |
| WO | WO 2008/081693 A1 | 7/2008 | |

OTHER PUBLICATIONS

Office Action Chinese Patent Application No. 201080043827.0 dated Jan. 6, 2014.

* cited by examiner

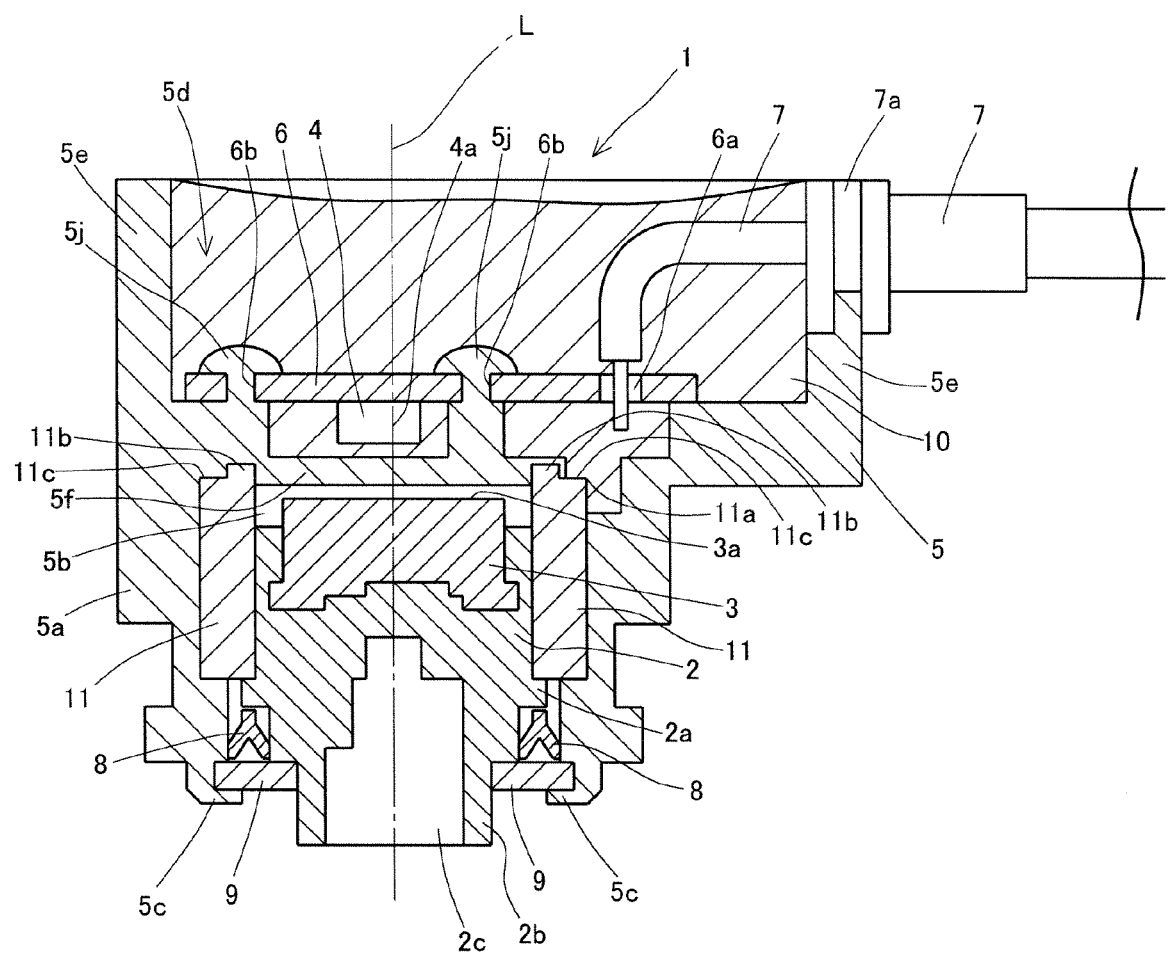

ROTATION ANGLE DETECTING DEVICE

RELATED APPLICATIONS

This application is the U.S. National Phase under 35 U.S.C. §371 of International Application No. PCT/JP2010/066028, filed on Sep. 16, 2010, which in turn claims the benefit of Japanese Application No. 2009-227390, filed on Sep. 30, 2009, the disclosures of which Applications are incorporated by reference herein.

TECHNICAL FIELD

The present invention relates to a rotation angle detecting device for detecting the rotation angle of an object under detection.

BACKGROUND ART

Known conventional rotation angle detecting devices include a throttle position sensor which detects the rotation angle of a shaft of a throttle valve (that is, the open/close angle of the throttle valve) when the shaft is rotated in association with the open/close operation of the throttle valve placed within an aspiration path of an internal combustion engine (see, for example, Patent Document 1).

The rotation angle detecting device realized by the throttle position sensor described in Patent Document 1 is mainly formed of a rotation shaft (rotation member) which rotates in response to the rotation of the shaft, a pair of magnets which rotates around the rotation shaft in synchronization with the rotation of the rotation shaft, a magneto-electric conversion element which is placed at the back of the rotation shaft and detects a change in the magnitude of a magnetic flux (the magnitude of a magnetic field) in association with the rotation operation of each of the magnets, a magnetic member of generally cylindrical cap shape including an annular portion having an insertion fixing portion for inserting and fixing a lower end portion of the rotation shaft and a tubular portion covering each of the magnets, and a housing of generally cylindrical cap shape including an annular plate portion having a penetration portion through which the rotation shaft passes and a cylindrical portion covering the outer periphery of the tubular portion and accommodating the magnetic member.

Since the rotation angle detecting device described in Patent Document 1 includes the housing which rotatably supports the rotation member serving as the rotation shaft and the cover accommodating the magneto-electric conversion element, the rotation angle detecting device has the problem in that the number of parts constituting the device is increased to require higher assembly cost and parts cost to result in an increase in the overall cost.

To address the abovementioned problem, the present applicant has proposed a rotation angle detecting device capable of reducing cost in which a magnet rotating with a rotation member in response to the rotation of an object under detection is provided, a magneto-electric conversion element detecting the magnitude of a magnetic flux changing with the rotation of the magnet is used to output a detection signal according to the rotation of the object under detection, and a metal member rotatably supports the rotation member is formed integrally with a housing through insertion molding (see Patent Document 2).

PRIOR ART REFERENCES

Patent Documents

Patent Document 1: JP-A-11-153404
Patent Document 2: JP-A-2007-327860

SUMMARY OF THE INVENTION

Problems that the Invention is to Solve

The housing of the rotation angle detecting device described in Patent Document 2 includes a first accommodating portion for accommodating the magnet and a second accommodating portion for accommodating the magneto-electric conversion element. The first accommodating portion and the second accommodating portion are separated from each other. The second accommodating portion is filled with a filling member, and the magneto-electric conversion element is hermetically sealed and held within the second accommodating portion of the housing.

The metal member needs to be held in the insertion molding with the housing. The portion for holding the metal member is exposed within the second accommodating portion after the molding of the housing.

In filling the filling member into the second accommodating portion, the filling member may be introduced between the metal member and the housing from the portion exposed in the second accommodating portion of the metal member to enter the first accommodating portion. There has been a possibility that the filling member entering the first accommodating portion may prevent the rotation member with the magnet from being accommodated or may abut on the magnet or the rotation member to hinder the rotation of the magnet or the rotation member.

To address this, in view of the abovementioned problem, it is an object of the present invention to provide a rotation angle detecting device capable of preventing a filling member filled into a second accommodating portion for accommodating a magneto-electric conversion element from entering a first accommodating portion for accommodating a magnet.

Means for Solving the Problems

The present invention provides a rotation angle detecting device including a rotation member, a magnet fixed to the rotation member and rotating in association with rotation of the rotation member, a magnetism detecting package placed opposite to the magnet and including a magneto-electric conversion element detecting a magnitude of a magnetic field of the magnet in the rotation of the magnet, a housing having a first accommodating portion rotatably accommodating the rotation member and a second accommodating portion accommodating the magnetism detecting package with a partition serving as a reference, a filling member filled to accommodate and hold hermetically the magnetism detecting package in the second accommodating portion, and a cylindrical metal member provided for the first accommodating portion to rotatably support the rotation member such that a portion of the metal member is exposed in the second accommodating portion, characterized in that a creepage distance extending portion is provided near the portion of the metal member exposed in the second accommodating portion at a portion contained in the housing, the creepage distance extending portion preventing the filling member from being introduced between the metal member and the housing.

In the present invention, the creepage distance extending portion is a protrusion portion protruding from the metal member.

In the present invention, the creepage distance extending portion is a depression portion recessed in the metal member.

In the present invention, the creepage distance extending portion is a depression and protrusion portion provided for the metal member.

In the present invention, the protrusion portion is provided on an end face of the tubular metal member.

Advantage of the Invention

According to the present invention, the intended object can be achieved. Specifically, it is possible to provide the rotation angle detecting device capable of preventing the filling member filled in the second accommodating portion for accommodating the magneto-electric conversion element from entering the first accommodating portion for accommodating the magnet.

BRIEF DESCRIPTION OF THE DRAWING

[FIG. 1] A section view of a rotation angle detecting device according to a first embodiment of the present invention.

MODE FOR CARRYING OUT THE INVENTION

An embodiment of the present invention will hereinafter be described with the accompanying drawings.

A rotation angle detecting device 1 according to the present embodiment is formed mainly of a rotation member 2, a magnet 3, a magnetism detecting package 4 containing a magneto-electric conversion element 4a, a housing 5, a circuit board 6, and a wiring 7. L indicates a rotation axis of the rotation member 2 and the magnet 3.

The rotation member 2 rotates with an object under detection coupled thereto and is made of a synthetic resin material such as polyacetal.

The rotation member 2 has a generally cylindrical shape and has a flange portion 2a without any breaks on the periphery. The rotation member 2 includes a hermetic member, later described, below the flange portion 2a in FIG. 1. The rotation member 2 also includes a small-diameter portion 2b having a smaller diameter below the hermetic member. The small-diameter portion 2b is provided with a depression portion 2c for coupling to the object under detection. The magnet 3 is provided above the flange portion 2a in FIG. 1.

The magnet 3 is formed in a generally cylindrical shape. The magnet 3 has a flat face 3a perpendicular to the rotation axis L and the flat face 3a is magnetized with two poles such that the rotation axis L corresponds to the boundary between them. The magnet 3 is fixed to the rotation member 2, and is provided integrally with the rotation member 2 through insertion molding in the present embodiment. The magnet 3 is formed to rotate with the rotation of the rotation member 2 about the rotation axis L of the rotation member 2.

The magnetism detecting package 4 is formed by covering the magneto-electric conversion element 4a such as a hall IC and an MR element with a synthetic resin. The magnetism detecting package 4 is provided on the circuit board 6, and the magneto-electric conversion element 4a of the magnetism detecting package 4 is electrically connected to the circuit board 6 through a lead, not shown, detects the magnitude of a magnetic field changing in response to the rotation of the magnet 3 rotating with the rotation of the rotation member 2, converts the detected result into a detection signal, and outputs the detection signal to the outside through the wiring 7 electrically connected to the circuit board 6.

The housing 5 is made of a thermoplastic resin material such as polybutylene terephthalate and includes a base portion 5a formed in a generally cylindrical shape. A first accommodating portion 5b for rotatably accommodating the rotation member 2 is formed in the base portion 5a.

In FIG. 1, a lower end portion 5c of the base portion 5a on the lower side forming the first accommodating portion 5b is bent inside the first accommodating portion 5b for swaging a washer, later described.

In FIG. 1, a second accommodating portion 5d is formed for accommodating the magnetism detecting package 4 and the circuit board 6 on the upper side of the housing 5. The second accommodating portion 5d is formed by a wall portion 5e which surrounds the circuit board 6. The second accommodating portion 5d is filled with a filling member 10. The filling member is made of a resin such as epoxy and silicone which solidifies from liquid into solid. The filling member is an ultraviolet cure or thermosetting resin, for example, and the magnetism detecting package 4 and the circuit board 6 are hermetically housed and held within the second accommodating portion 5d.

The first accommodating portion 5b and the second accommodating portion 5d are separated by a plate-shaped partition 5f to prevent communication between them. The magnetism detecting package 4 and the magnet 3 are opposite to each other with the partition 5f interposed between them. The first accommodating portion 5b, the second accommodating portion 5d, and the partition 5f are formed integrally.

The first accommodating portion 5b is provided with a cylindrical metal member 11 which is formed integrally with the housing 5 through insertion molding. The metal member 11 is made of a non-magnetic material such as brass and rotatably supports the rotation member 2. Specifically, the metal member 11 has the function as a support member for rotatably supporting the rotation member 2 through abutment of the inner peripheral face of the metal member 11 on the outer periphery of the rotation member 2. A portion 11a of the metal member 11 is exposed within the second accommodating portion 5d.

A creepage distance extending portion 11b is provided near the portion 11a of the metal member 11 that is exposed in the second accommodating portion 5d at a portion contained in the housing 5 for preventing the filling member 10 from leaching between the metal member 11 and the housing 5.

The creepage distance extending portion 11b is provided on an end face 11c of the metal member 11 of tubular shape and inside the end face 11c. The creepage distance extending portion 11b is a protrusion portion 11b protruding from the metal member 11 toward the central axis of the cylindrical metal member 11. The protrusion portion 11b has a rectangular sectional shape. The protrusion portion 11b is provided on the end face 11c of the metal member 11 without any breaks. The protrusion portion 11b is formed by rotating about the center of the cylindrical metal member 11 and cutting the cylindrical metal member 11 from the outside by a cutting tool.

As described above, the creepage distance extending portion 11b is provided. Thus, even when the filling member 10 is leached between the metal member 11 and the housing 5 from the portion 11a of the metal member 11 exposed in the second accommodating portion 5d in filling the filling member 10 into the second accommodating portion 5d, the creepage distance extending portion 11b increases the distance between the metal member 11 and the housing 5 from the exposed portion 11a to the first accommodating portion 5b, so that the filling member 10 can be stopped somewhere between the exposed portion 11a and the first accommodating portion 5b to prevent the entrance into the first accommodating portion 5b.

Since the protrusion portion 11b is provided on the end face 11c of the tubular metal member 11, the machining through cutting is more easily performed and the metal member 11 can be formed at lower cost as compared with the formation on the tubular inner periphery of the tubular metal member 11.

The housing 5 has a positioning portion 5j formed therein for determining the position to place the circuit board 6. The positioning portion 5j is provided within the second accommodating portion 5d. The positioning portion 5j has a protruding shape before the fixing of the circuit board 6 and is deformed through heating or the like in order to attach the circuit board 6, thereby preventing removal of the circuit board 6.

The circuit board 6 is made of a hard circuit board, for example, is placed along the partition 5f of the housing 5, and is housed and fixed in the second accommodating portion 5d of the housing 5. The circuit board 6 has various electronic parts mounted thereon such as the magnetism detecting package 4 and a capacitor. Reference numeral 6a shows a hole through which the wiring 7 passes, and the wiring 7 passing through the hole 6a is electrically connected to a wiring pattern, not shown, of the circuit board 6 through soldering, not shown. Reference numeral 6b shows a positioning portion for determining the position to place the circuit board 6 and is a hole through which the positioning portion 5j of the housing 5 passes.

The wiring 7 is formed by covering metal having favorable conductivity such as copper with an insulating material. Reference numeral 7a shows a packing made of an elastic member such as rubber and prevents leakage of the filling member 11 filling the second accommodating portion 5d.

Reference numeral 8 shows a hermetic member made of an elastic member such as rubber and is realized by using a Y ring in the present embodiment. The Y ring 8 has a doughnut shape with a Y sectional shape and has the function of preventing introduction of a foreign matter such as water into the first accommodating portion 5b of the rotation angle detecting device 1. The elasticity of the Y ring 8 can suppress fluctuations of the magnet 3 due to vibrations to prevent erroneous detection with the magneto-electric conversion element 4a. Since the Y ring 8 is in contact over a small area with the rotation member 2 and the housing 5, the sliding resistance in the rotation of the rotation member 2 can be reduced. Instead of the Y ring 8, an X ring having an X sectional shape may be used. If the sliding resistance in the rotation of the rotation member 2 is not considered, an O ring 8 having a circular sectional shape may be used.

Reference numeral 9 shows a washer which swages the lower end portion 5c of the housing 5 so as to cover the Y ring 8, thereby holding the rotation member 2 within the first accommodating portion 5b.

While the creepage distance extending portion lib has the shape of the protrusion portion 11b protruding from the metal member 11 in the present embodiment, the present invention is not limited to the present embodiment. For example, the creepage distance extending portion lib may have a depression portion recessed in the metal member 11 or may have a depression and protrusion portion provided for the metal member 11.

The position to provide the creepage distance extending portion 11b is not limited to the end face 11c of the metal member 11, and the creepage distance extending portion 11b may be provided on the outer peripheral face of the metal member 11. When it is provided on the outer peripheral face of the metal member 11, a depression portion or a depression and protrusion portion can be machined easily.

Industrial Applicability

The present invention can be utilized in the rotation angle detecting device for detecting the rotation angle of the object under detection.

DESCRIPTION OF REFERENCE NUMERALS AND SIGNS

1 Rotation angle detecting device
2 Rotation member
3 Magnet
4 Magnetism detecting package
4a Magneto-electric conversion element
5 Housing
5b First accommodating portion
5d Second accommodating portion
5f Partition
10 Filling member
11 Metal member
11a Portion (Exposed portion)
11b Creepage distance extending portion
11c End face

The invention claimed is:

1. A rotation angle detecting device comprising:
a rotation member;
a magnet fixed to the rotation member and rotating in association with rotation of the rotation member;
a magnetism detecting package placed opposite to the magnet and including a magneto-electric conversion element detecting a magnitude of a magnetic field of the magnet in the rotation of the magnet;
a housing having a first accommodating portion rotatably accommodating the rotation member and a second accommodating portion accommodating the magnetism detecting package with a partition serving as a reference;
a filling member made of a resin filled to accommodate and hold hermetically the magnetism detecting package in the second accommodating portion; and
a cylindrical metal member provided for the first accommodating portion to rotatably support the rotation member such that a portion of the cylindrical metal member is exposed in the second accommodating portion,
wherein a creepage distance extending portion is provided near the portion of the cylindrical metal member exposed in the second accommodating portion at a portion contained in the housing, the creepage distance extending portion preventing the filling member from being introduced between the cylindrical metal member and the housing.

2. The rotation angle detecting device according to claim 1, wherein the creepage distance extending portion is a protrusion portion protruding from the metal member.

3. The rotation angle detecting device according to claim 1, wherein the creepage distance extending portion is a depression portion recessed in the metal member.

4. The rotation angle detecting device according to claim 1, wherein the creepage distance extending portion is a depression and protrusion portion provided for the metal member.

5. The rotation angle detecting device according to claim 2, wherein the protrusion portion is provided on an end face of the tubular metal member.

* * * * *